United States Patent [19]

Henle

[11] Patent Number: 4,530,251
[45] Date of Patent: Jul. 23, 1985

[54] APPARATUS FOR TRANSMITTING MOTION TO WORK-SUPPORTING TABLES OF MACHINE TOOLS AND THE LIKE

[75] Inventor: Karl Henle, Reinbek, Fed. Rep. of Germany

[73] Assignee: Hauni-Werke Körber & Co. KG, Hamburg, Fed. Rep. of Germany

[21] Appl. No.: 510,408

[22] Filed: Jul. 1, 1983

[30] Foreign Application Priority Data

Jul. 31, 1982 [DE] Fed. Rep. of Germany ....... 3228690

[51] Int. Cl.³ .............................................. F16H 29/20
[52] U.S. Cl. .................................. 74/89.15; 74/424.8 R
[58] Field of Search ........................ 74/89.15, 424.8 R

[56] References Cited

U.S. PATENT DOCUMENTS

| | | | |
|---|---|---|---|
| 3,069,924 | 12/1962 | Watanabe et al. | 74/424.8 R |
| 3,337,732 | 8/1967 | Opocensky | 74/424.8 R |
| 3,665,782 | 5/1972 | Loftus | 74/424.8 R |
| 3,703,835 | 11/1972 | O'Connor et al. | 74/441 |
| 3,745,840 | 7/1973 | Guralnick | 74/89.15 |
| 4,131,029 | 12/1978 | Harbaugh et al. | 74/89.15 |
| 4,302,981 | 12/1981 | Wayman | 74/89.15 |
| 4,302,982 | 12/1981 | D'Angelo | 74/424.8 R |
| 4,372,223 | 2/1983 | Iwatani | 74/89.15 X |

Primary Examiner—Lawrence Staab
Assistant Examiner—Dwight G. Diehl
Attorney, Agent, or Firm—Peter K. Kontler

[57] ABSTRACT

The frame of a machine tool supports a feed screw which can be rotated by a reversible motor and meshes with a nut connected to the work-supporting table of the machine tool by a pair of links flanking the feed screw and disposed in planes which are parallel to the axis of the feed screw. The end portions of the links are pivotable without play about pins which are embedded in the underside of the table and about pins which are embedded in the nut. Such articulate connection between the table and the nut ensures that vibrations, flexure and/or other stray movements of the feed screw are not transmitted to the workpiece or workpieces on the table.

4 Claims, 4 Drawing Figures

APPARATUS FOR TRANSMITTING MOTION TO WORK-SUPPORTING TABLES OF MACHINE TOOLS AND THE LIKE

BACKGROUND OF THE INVENTION

The present invention relates to apparatus for transmitting reciprocatory motion by resorting to rotary feed screws and nuts whose internal threads mate with the external threads of the feed screws. More particularly, the invention relates to improvements in apparatus which can be utilized with advantage in machine tools of various kinds to reciprocate one or more mobile components, e.g., to reciprocate the work-supporting table of a surface grinding machine.

It is well known to provide the underside of a work-supporting table with a nut (or to machine the nut directly into the table) and to bring the internal threads of the nut into mesh with the external threads of a feed screw which is mounted for rotation about a fixed axis and is driven by a reversible electric motor to move the table back and forth, depending on the selected direction of rotation of the motor. Such mode of reciprocating the table is acceptable when the speed of the table is low and when the workpiece or workpieces on the table need not be treated with a very high degree of accuracy. However, the situation is quite different in modern high-speed machine tools, such as precision surface grinding machines, which must be capable of treating the workpieces with a very high degree of accuracy and in such a way that the ultimate finish of each of a short, medium long or very long series of workpieces is always the same. The requirements regarding the accuracy apply not only to the dimensions of the workpieces but also as concerns the finish of their surfaces.

OBJECTS AND SUMMARY OF THE INVENTION

An object of the invention is to provide a novel and improved apparatus which can reciprocate a mobile component, such as the work-supporting table of a machine tool, by means of a feed screw and a nut with a heretofore unmatched degree of accuracy, reproducibility and reliability.

Another object of the invention is to provide the apparatus with novel and improved means for estabishing a motion-transmitting connection between the feed screw and the mobile component.

A further object of the invention is to provide a simple, compact and inexpensive but highly reliable and rugged apparatus for reciprocating the work-supporting table of a surface grinding machine or another machine tool.

An additional object of the invention is to provide a novel and improved method of preventing the transmission of stray movements of a rotating feed screw to one or more parts which are reciprocated by the feed screw.

Still another object of the invention is to provide an apparatus which shields the mobile component or components of a machine tool or the like from influences which are attributable to the dynamics and/or design of the feed screw, of the means for rotating the feed screw and of the means for supporting the feed screw in a machine tool or the like.

An additional object of the invention is to provide an apparatus which enables a machine tool to turn out finished or semi-finished products whose quality is superior to that of products which are treated in conventional machine tools.

Another object of the invention is to provide an apparatus which can be installed in existing machine tools or the like as a superior substitute for heretofore known apparatus.

A further object of the invention is to provide the apparatus with novel and improved means for preventing stray movements of certain of its constituents to thus ensure that the apparatus will be capable of transmitting motion with the prescribed degree of accuracy for any desired period of time.

The invention is embodied in an apparatus for transmitting reciprocatory motion to a mobile component, particularly for moving back and forth a work-supporting table with reference to the frame of a surface grinding machine or another machine tool. The apparatus comprises an elongated rotary feed screw, means (preferably including a reversible prime mover) for rotating the feed screw, a nut meshing with the feed screw, and means for articulately connecting the nut with the mobile component. The apparatus preferably further comprises a support (e.g., the aforementioned frame) for the feed screw and guide means for the mobile component. The guide means can be provided on the support and extends in parallelism with the feed screw.

The connecting means preferably comprises at least one link and means for movably securing the link to the nut and/or to the mobile component. In accordance with a presently preferred embodiment of the invention, the connecting means comprises two parallel links which are disposed at the opposite sides of the feed screw in planes which are parallel to the axis of the feed screw, and the securing means comprises two pairs of parallel pivot members. One of each pair of pivot members is provided on the nut and the other pivot member of each pair is provided on the mobile component. Still further, the apparatus preferably comprises bearings for the pivot members (such bearings may constitute antifriction ball or roller bearings installed in the links and surrounding the respective pivot members) and means (e.g., adjustable screws mounted in the links) for eliminating play between such bearings and the respective pivot members. Such screws can be adjusted with reference to the corresponding links to confine the links to pivotal movements with reference to the nut and with reference to the mobile support, i.e., to eliminate any stray movements of the links with reference to such parts.

Still further, the apparatus preferably comprises a rigid crossbeam or other suitable means for rigidly coupling the links to one another, e.g., by resorting to a plurality of screws, bolts or analogous fasteners, at least two for each of the links. This further reduces the likelihood of stray movements of the links with reference to the nut and/or mobile component.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
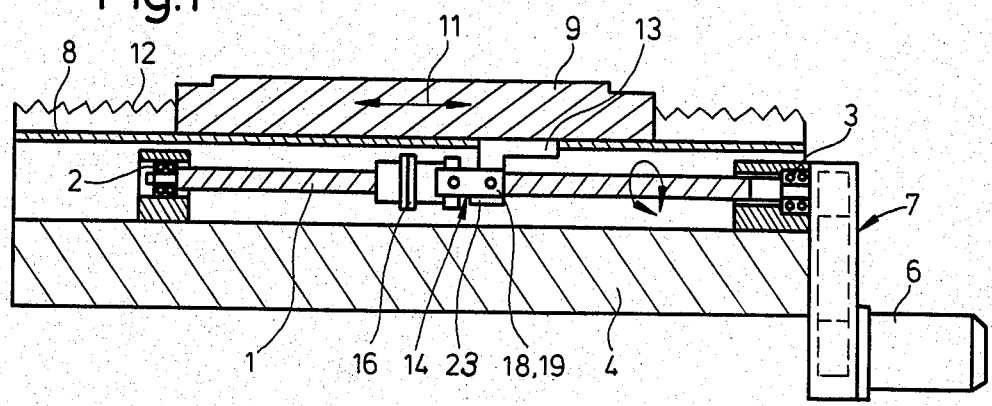
FIG. 1 is a fragmentary vertical sectional view of a machine tool, showing the improved apparatus for moving a work-supporting table-like mobile component back and forth with reference to a stationary frame.

The drawing illustrates a portion of a machine tool, e.g., a surface grinding machine of the type disclosed in the commonly owned copending patent application Ser. No. 232,250 filed Feb. 6, 1981 by Werner Radeker et al. for "Grinding Machine", now U.S. Pat. No. 4,417,422 granted Nov. 29, 1983. The disclosure of this copending application is incorporated herein by reference.

The machine tool comprises a frame including a support or base 4 and a mobile component 9 which is reciprocable in directions indicated by a double-headed arrow 11 by means of an apparatus which embodies the present invention. The support 4 need not be stationary, e.g., such support can constitute a carriage which is movable with reference to a stationary plate of the frame.

The improved apparatus comprises an elongated rotary feed screw or spindle 1 which is a so-called ballscrew and whose end portions are rotatably journalled in bearings 2 and 3 provided on the support 4. The right-hand end portion of the feed screw 1, as viewed in FIG. 1, can receive torque from a reversible prime mover 6 (e.g., a suitable electric motor) by way of a transmission 7 which may constitute a gear transmission. The support 4 further carries elongated guide means or ways 8 for the mobile component or table 9, and such ways are parallel to the axis of the feed screw 1 which is assumed to be installed in such a way that its axis is located in a horizontal plane. The reference character 12 denotes in FIG. 1 one of the bellows or analogous deformable means connected to the mobile component 9 and serving to shield the ways 8 from dust, chips, boring liquid, shavings and/or other contaminants which are a necessary adjunct of the treatment of one or more workpieces (not shown) on the mobile component 9 by one or more grinding, milling, boring or other tools. The ways 8 are disposed at a level above the feed screw 1 which latter meshes with a nut 16.

Figure 2:
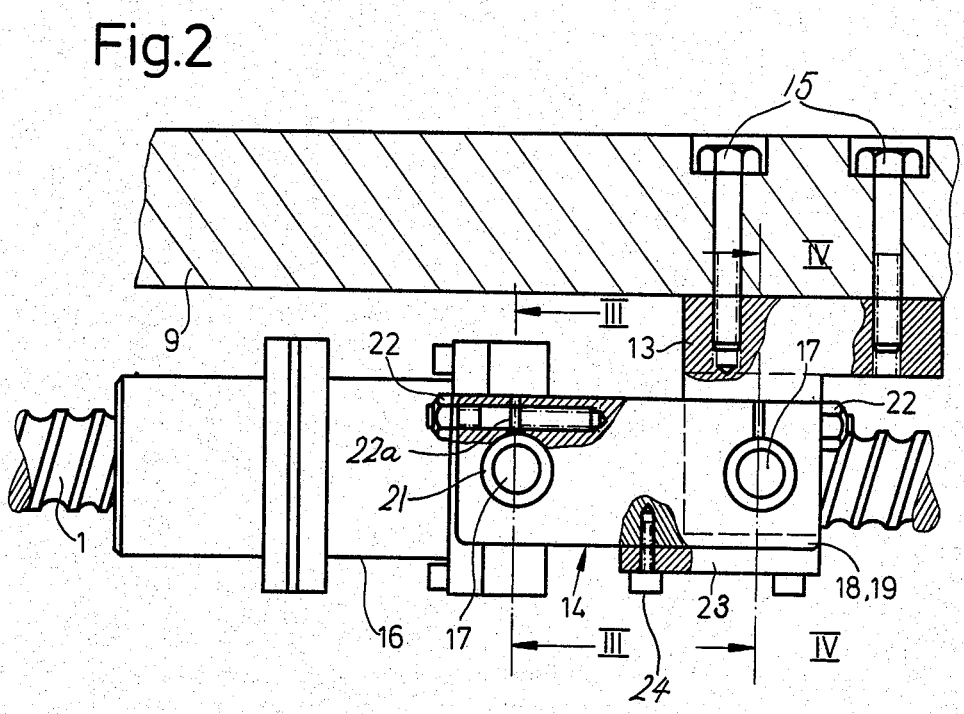
FIG. 2 is a greatly enlarged partly elevational and partly vertical sectional view of a detail in the structure of FIG. 1, showing the manner in which the nut is articulately connected with the mobile component.
Figure 3:
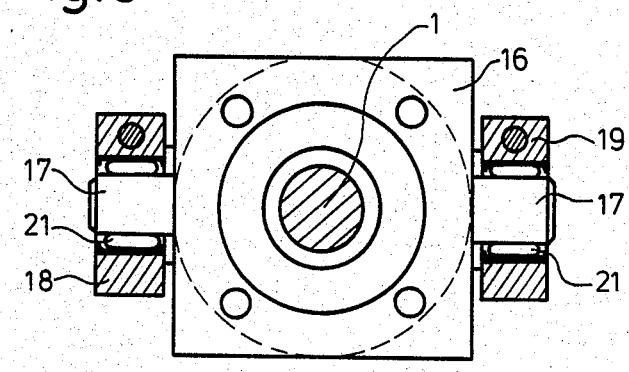
FIG. 3 is an enlarged fragmentary transverse vertical sectional view as seen in the direction of arrows from the line III—III of FIG. 2.
Figure 4:
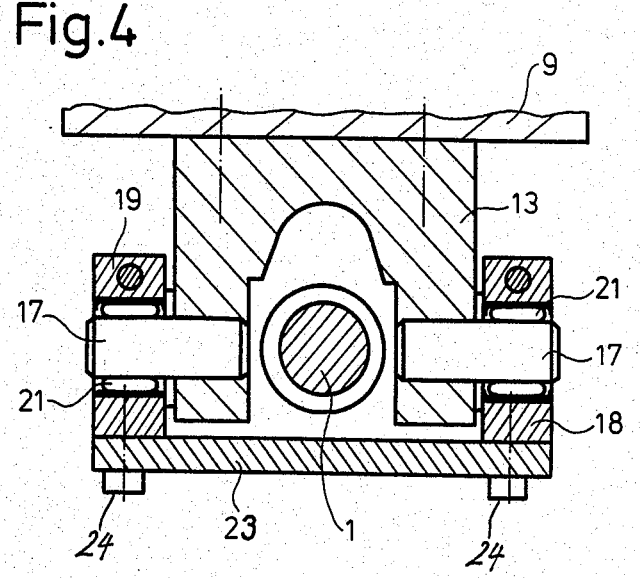
FIG. 4 is an enlarged fragmentary transverse vertical sectional view as seen in the direction of arrows from the line IV—IV of FIG. 2.

In accordance with a feature of the invention, the nut 16 is not rigidly connected with the underside of the mobile component 9. Instead, the component 9 is provided with a rigid block-shaped member 13 which is secured thereto by several screws, bolts or similar fasteners 15. The apparatus further comprises an articulate connection 14 between the nut 16 and the block-shaped member 13 which latter, for all practical purposes, can be said to form part of the mobile component 9. The articulate connection 14 comprises two parallel links 18, 19 which are disposed at the opposite sides of the feed screw 1 in planes which are parallel to the axis of the feed screw. In addition, the articulate connection 14 comprises two pairs of parallel securing means in the form of pivot members 17. One pivot member 17 of each pair is fixedly installed in the block-shaped member 13 (see FIG. 4), and the other pivot member 17 of each pair is fixedly installed in the nut 16. Portions of the pivot members 17 extend from the nut 16 and from the member 13 and are surrounded by antifriction needle, ball or roller bearings 21 which are installed in the respective end portions of the corresponding links 18 and 19. In order to prevent the links 18, 19 from wobbling or from performing other stray movements relative to the respective pivot members 17, each of the links 18, 19 carries two adjusting screws 22 having shoulders 22a (see particularly FIG. 2) which can be caused to bear against the respective bearings 21 to eliminate any play, i.e., to ensure that the links 18 and 19 are free to pivot relative to the corresponding pairs of pivot members 17 in planes which are parallel to the axis of the feed screw 1 but cannot perform any other movements. The nut 16 and the two links 18, 19 can be said to constitute a simple parallel motion mechanism which allows for limited movements of the feed screw 1 relative to the mobile component 9 so that the vibrations and/or flexures and/or other stray movements of the feed screw 1 are not transmitted to the mobile component 9 which, as stated above, supports one or more workpieces during treatment of the workpiece or workpieces by one or more grinding, drilling, milling and/or other tools.

In order to further reduce the likelihood of uncontrolled stray movements of the links 18, 19 with reference to the nut 16 and/or mobile component 1, the apparatus preferably further comprises a crossbeam 23 or analogous means for rigidly connecting the two links to each other. The end portions of the crossbeam 23 are preferably secured to the corresponding links 18, 19 by two or more screws, bolts or other suitable fasteners 24.

The mounting of the links 18, 19 in two planes which are also parallel to the axis of the feed screw 1, the placing of the feed screw 1 between the two links, the establishment of a rigid connection between the two links, and the provision of means for eliminating play between the pivot members 17 and the links ensure that rotation of the feed screw 1 in a clockwise or counterclockwise direction at any one of a range of different speeds does not entail the transmission of bending stresses to the ways 8 and/or mobile component 1 so that the workpiece or workpieces on the component 1 can be treated with a surprisingly high degree of predictability and accuracy. The links 18, 19 can be modified in a number of ways without departing from the spirit of the invention. In fact, under certain circumstances, the articulate connection 14 can employ a single link even though the utilization of several links is preferred for obvious reasons. Thus, such plural links (especially if rigidly coupled to each other by the crossbeam 23 or in an analogous manner) contribute significantly to the resistance of the improved apparatus to stresses which could adversely influence the movements and guidance of the mobile component 1 along the ways 8.

An important advantage of the improved apparatus is that it can fully compensate for eventual deviations of the dimensions of various parts from optimum dimensions as well as that the apparatus can compensate for eventual tolerances in installation of the feed screw 1 in or on the support 4. Moreover, and as already mentioned above, the improved apparatus can prevent vibrations, flexures and/or other undesirable movements of the feed screw 1 from influencing the quality of treatment of the workpiece or workpieces on the mobile component 1. The likelihood of vibration and/or flexing of the feed screw 1 is particularly pronounced if the feed screw is relatively long. The apparatus also automatically compensates for eventual deviations of the ways 8 from positions of exact parallelism with the feed screw 1. It has been found that the improved apparatus enables a machine tool to treat the workpieces with a degree of accuracy and predictability which greatly exceeds that of conventional machine tools or like devices wherein the feed screw meshes with a nut which is rigidly connected directly with the mobile component. Not only are the workpieces on the mobile component 1 more likely to be treated with minimal tolerances but the surface finish of the workpieces (e.g., in a grinding, polishing, lapping or like machine) is also superior to the surface finish of workpieces which are treated in conventional machine tools not embodying the apparatus of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transmitting reciprocatory motion to a mobile component, particularly for moving back and forth a work-supporting table with reference to the frame of a machine tool, comprising an elongated rotary feed screw; motor means for rotating said feed screw; a nut meshing with said feed screw; and means for articulately connecting said nut with said component, comprising a single pair of links disposed at the opposite sides of and being parallel to said feed screw, first pivot means articulately connecting said links to said nut for angular movement about a first axis, second pivot means articulately connecting said links to said component for angular movement about a second axis which is parallel to said first axis, means for rigidly connecting said links to each other, bearings for said pivot means, and means for eliminating play between said bearings and the respective pivot means.

2. The apparatus of claim 1, wherein said motor means comprises a reversible prime mover.

3. The apparatus of claim 2, further comprising a support for said feed screw and guide means for said component, said guide means being provided on said support and extending in parallelism with said feed screw.

4. The apparatus of claim 1, wherein said links are pivotable in planes which are parallel to the axis of said feed screw.

* * * * *